United States Patent
Hanson et al.

(10) Patent No.: US 6,480,130 B1
(45) Date of Patent: Nov. 12, 2002

(54) METHOD FOR IMPROVING REPEATABILITY AND REMOVING HYSTERESIS FROM ELECTROMECHANICAL ACTUATORS

(75) Inventors: Mark B. Hanson, Niles, MI (US); Russ Ether, South Bend; Allan W. Blunt, Granger, both of IN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/894,056

(22) Filed: Jun. 28, 2001

(51) Int. Cl.$^7$ .................................................. H03M 1/66
(52) U.S. Cl. ........................ 341/144; 188/71.5; 318/629
(58) Field of Search ................................. 341/144, 145, 341/151, 114; 318/56, 57, 62, 63, 542, 362, 808

(56) References Cited

U.S. PATENT DOCUMENTS

| | | | |
|---|---|---|---|
| 3,886,819 A | | 6/1975 | Lentz ............................ 74/868 |
| 4,047,454 A | | 9/1977 | McQuinn ...................... 74/868 |
| 4,053,137 A | | 10/1977 | Raymond ..................... 251/65 |
| 4,089,503 A | | 5/1978 | Raymond ..................... 251/65 |
| 4,355,358 A | * | 10/1982 | Clelford et al. .............. 364/424 |
| 5,155,422 A | * | 10/1992 | Sidman et al. ............... 318/560 |
| 5,184,054 A | | 2/1993 | Delattre ........................ 318/586 |
| 5,274,313 A | * | 12/1993 | Amrhein ....................... 318/629 |
| 5,279,480 A | | 1/1994 | Derrien ........................ 244/104 |
| 5,310,139 A | | 5/1994 | Derrien ........................ 244/104 |
| 5,323,102 A | | 6/1994 | Torii ............................ 322/90 |
| 5,360,185 A | | 11/1994 | Derrien ........................ 244/102 |
| 5,370,011 A | | 12/1994 | Gilges ............................ 74/89 |
| 5,530,326 A | * | 6/1996 | Galvin et al. ................ 318/254 |
| 5,606,236 A | | 2/1997 | Tennies ........................ 318/626 |
| 5,945,598 A | | 8/1999 | Enright ........................ 73/123 |
| 6,003,640 A | * | 12/1999 | Ralea .......................... 188/71.5 |
| 6,095,293 A | | 8/2000 | Brundrett ..................... 188/72.1 |
| 6,102,364 A | | 8/2000 | Busato .................. 251/129.05 |
| 6,145,370 A | | 11/2000 | Evans .............................. 73/7 |

* cited by examiner

Primary Examiner—Brian Young
Assistant Examiner—John Nguyen
(74) Attorney, Agent, or Firm—Larry J. Palguta

(57) ABSTRACT

A process of enhancing repeatability of the force applied to an object by an electromechanical system having an electric motor, a rotary to linear motion converter and a gear train mechanically coupling the motor to the converter includes providing an analog signal having a magnitude indicative of the desired force, supplying the analog signal to the motor to apply force to the object, removing the analog signal from the motor and reapplying the signal before any free play motion within the converter and gear train can occur. During a command for a desired force, the sequence of supplying the analog signal to the motor to apply force to the object, removing the analog signal from the motor, and resupplying the analog signal to the motor prior to any free play motion occurring within the gear train and converter are repeated several times. The rapid reapplication of the analog signal prevents any backlash associated with the gear train and converter. The process may be employed to selectively apply a compressive force to a compressible stack of interleaved braking disks to apply a braking force to a rotating wheel where an operator initiated digital braking command indicative of a desired braking force is converted to an analog signal having a magnitude indicative of the desired braking force to provide more consistent wheel braking in response to specific braking force commands.

20 Claims, 3 Drawing Sheets

METHOD FOR IMPROVING REPEATABILITY AND REMOVING HYSTERESIS FROM ELECTROMECHANICAL ACTUATORS

BACKGROUND OF THE INVENTION

The present invention relates to enhancing the consistency of responses of electromechanical actuators, and more particularly actuators for braking vehicles, for example, as found in electrically actuated aircraft braking systems.

An illustrative electrically actuated aircraft braking system is shown in U.S. Pat. No. 4,865,162 which teaches a plurality of annularly disposed electrically energizable torque motor and roller screw drive mechanisms for selectively engaging a pressure plate of a wheel and brake assembly and compressing a disc brake stack to retard aircraft motion. In such electrically actuated braking systems, there may be several electromechanical actuators associated with a given wheel which are actuated each time the brakes for that wheel are applied.

Electromechanical actuators including brake actuating motors involve low-torque components geared down to provide high-torque output. Friction and stiction can cause hysteresis between forward and reverse position or torque, and can adversely affect repeatability. Stiction describes a stick-slip effect where static friction interferes with movement in such a way that an actuator appears to "stick" short of the desired position and requires additional force before it moves, then sticks again. The word is a contraction of "sticky friction" and is sometimes spelled "sticktion."

Testing of certain braking systems has shown that, for a given force command, the force varies widely, and is not linear with command. There is also a significant hysteresis; that is, when force command is decreased vs. increased, the decrease does not always match the increase. The electromechanical actuator command-force curve also tends to flatten out at high and low command levels.

Dither is a frequently applied solution to problems of this nature. Dithering involves oscillating the command signal around the control point, causing the actuator to attempt to move backward and forward at high frequency, a frequency to which the actuator cannot fully respond. Dither can sometimes be used to improve accuracy in a positional control system, but requires the system (hardware and software) to be capable of responding to a frequency higher than what would otherwise be required. This additional design requirement can increase cost, weight and power consumption. Another drawback to the dither solution is that the motor is commanded to move in one direction and then the other direction, hence there may be hysteresis due to gear backlash.

It would be highly desirable to move an electromechanical actuator more reliably and repeatably to a commanded position, and to remove hysteresis when moving the actuator in the opposite direction.

SUMMARY OF THE INVENTION

The present invention provides solutions to the above problems by interrupting the force application electrically to provide a measured duty cycle for application of force. This duty cycle may be calibrated for period of repetition and for off time within the period of repetition. The repeated application and removal of force overcomes friction and sticktion in the actuator and provides highly repeatable performance.

An electronic actuator driver circuit provides separate electrical commands for force and enable of actuator. When the actuator is commanded to a position, the force command remains constant, and the disable command is cycled off and on to provide the required duty cycle. This enable/disable pulse train acts to cause small motor movements which overcome friction and stiction in the reduction gearing.

The invention comprises, in one form thereof, a process of applying a compressive force to a compressible stack of interleaved braking disks to apply a braking force to a rotating wheel and includes providing an operator-initiated digital braking command indicative of a desired braking force and converting that digital command to an analog signal having a magnitude indicative of the desired braking force. The analog signal is periodically interrupted and the interrupted analog signal supplied to a motor. Motor motion is mechanically converted from rotary to linear motion, for example, by a speed reducing, torque increasing gear train and ballscrew assembly, and the linear motion applied to compress the braking disks. Each analog signal interruption is for a time interval less than the time required to disable the motor and remove all braking force from the wheel and preferably, before any free-play motion can occur within the gear train.

An advantage of the present invention is that the force is always applied in the same direction thereby eliminating hysteresis due to gear backlash. Removal of force allows the item acted upon to "push back" on the engaged gear train, maintaining engagement and preventing backlash.

Another advantage is that the delays due to changed command level which may affect dithered signals are absent since command level is unchanged and the force is removed by an independent mechanism.

BRIEF DESCRIPTION OF THE DRAWINGS

Corresponding reference characters indicate corresponding parts throughout the several drawing views.

DETAILED DESCRIPTION OF THE INVENTION

Figure 1:
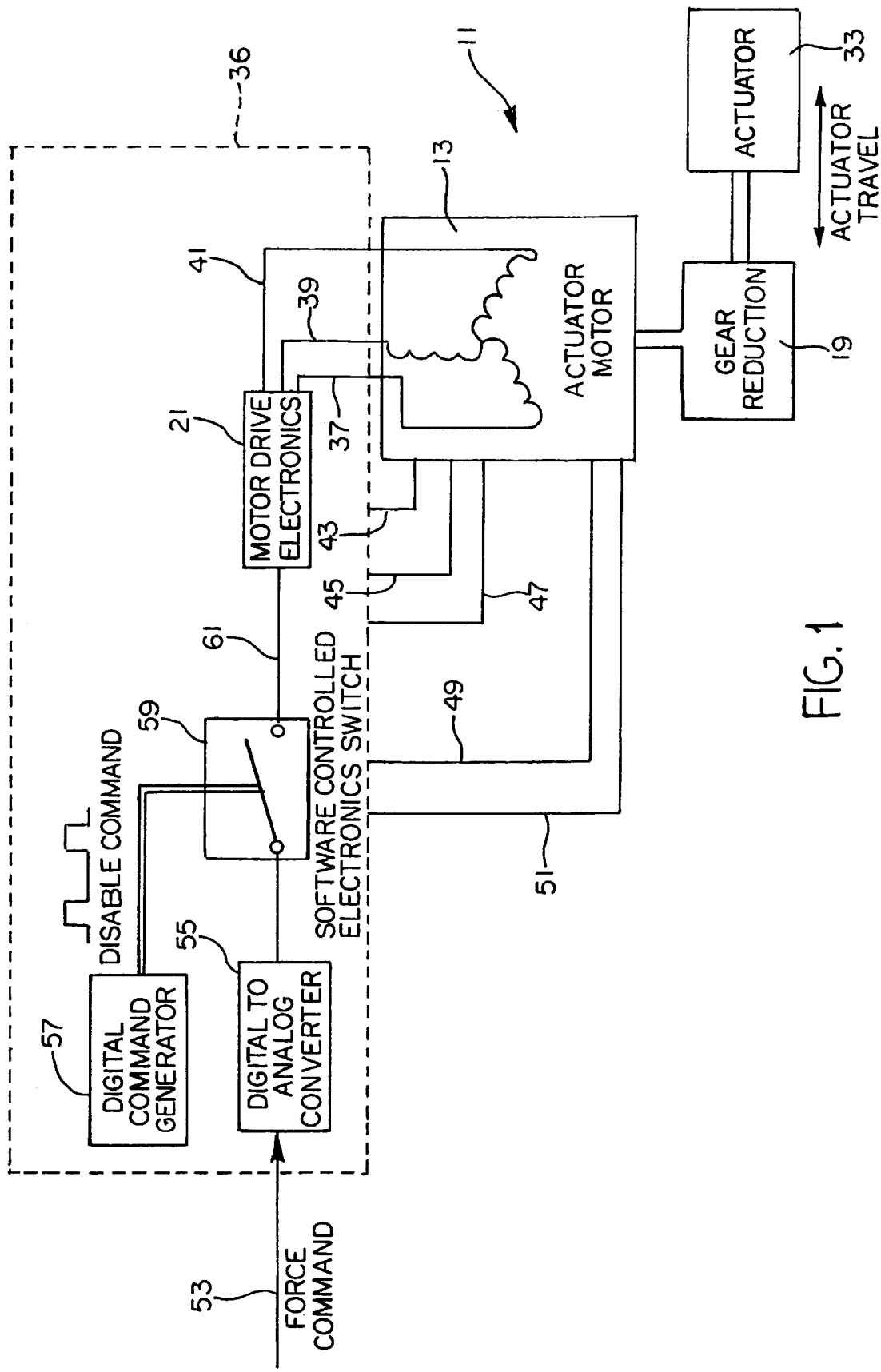
FIG. 1 is a schematic illustration of an electromechanical actuator and control circuit.
Figure 2:
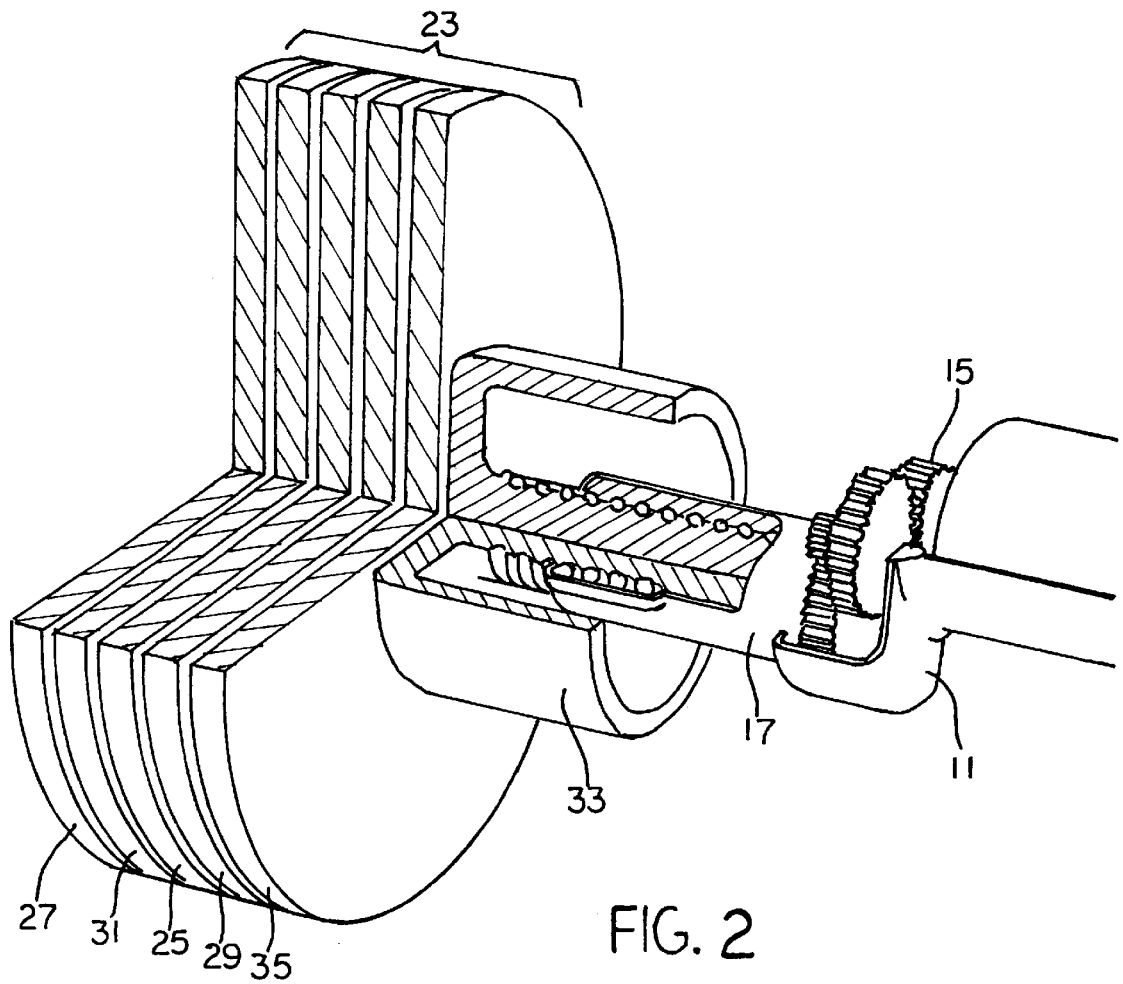
FIG. 2 is a cross-sectional view of an electromechanical disk brake actuator mechanism.

Referring now to the drawings and particularly to FIGS. 1 and 2, there is shown an electromechanical system including an electromechanical actuator 11 having a multi-winding direct current brushless electric motor 13, a speed reducing, torque increasing gear train 15 and a rotary to linear motion converter such as a ballscrew 17 with the gear train and converter indicated generally at 19. A commutator circuit is included within the motor drive electronics 21 for supplying the repeatedly interrupted analog signal sequentially to each of the motor windings.

In the exemplary environment of the actuator and brake assembly of FIG. 2, an illustrative electromechanical actuator 11 is fixed to a housing and a wheel is journalled for rotation about an axle. Motor speed is geared down by a gear train that drives a ballscrew arrangement which converts gear rotary motion into a linear motion of the piston 33. A brake disk stack 23 has alternate disks such as 25 and 27 fixed to and rotatable with the wheel while intervening disks such as 29 and 31 are stationary and fixed to the housing. When actuator 11 (along with a plurality of similar annularly disposed actuators) is energized, an actuator portion such as a piston 33 extends forcing the brake pressure plate 35 to compress the disk stack slowing the vehicle as is conventional in multidisk brake assemblies.

Current to and commutation of the actuator motor 13 is provided by electromechanical actuator controller 36. There are three high-voltage wires 37, 39, 41 from the controller 33 to power the three motor phases. Three position reference signals are returned by lines 43, 45 and 47, and a position reference excitation signal is provided by the controller on lines 49 and 51.

A force signal is developed from a digital command on line 53. The force signal may, for example, come over a data link from the avionics. This desired force command is processed by the onboard processor, and converted to an analog command by a digital to analog converter 55. The analog command is commutated and amplified by power circuitry in the motor drive electronics 21 to drive the motor to the desired force. The position feedback from the motor on lines 43, 45 and 47 is used by the power circuitry to provide commutation and distance traveled measurement when a command is provided to step back the actuator.

Figure 3:
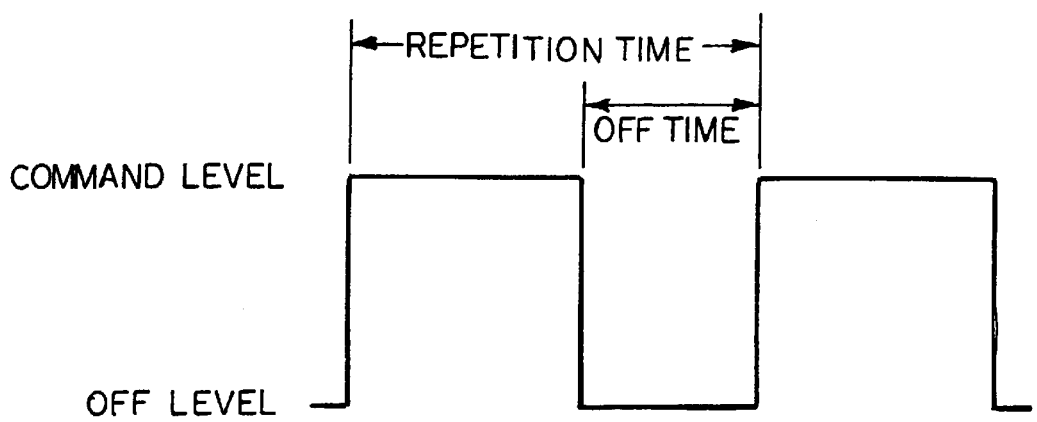
FIG. 3 is an illustration of the signal applied to the motor drive electronics of FIG. 1.

The circuit for repeatedly interrupting the analog signal actually pulses a disable signal at a certain frequency to improve performance of the actuator, reducing hysteresis and force uncertainty, and increasing maximum force applied by the actuator. The circuit includes a disable command generator 57 for creating a pulse train or disable command, and an electronic switching circuit 59 which is responsive to the pulse train to repetitively pass and block or periodically interrupt the analog signal in synchronism with the pulse train. An illustrative signal on line 61 is shown in FIG. 3. Circuit 21 supplies the periodically interrupted analog signal sequentially to each of the motor windings to generate a rotating magnetic field in the motor 13. The commutation may abruptly switch from one winding to the next, but more typically, it creates sequential signals which are waxing and waning to create a rotating magnetic field.

Figure 4:
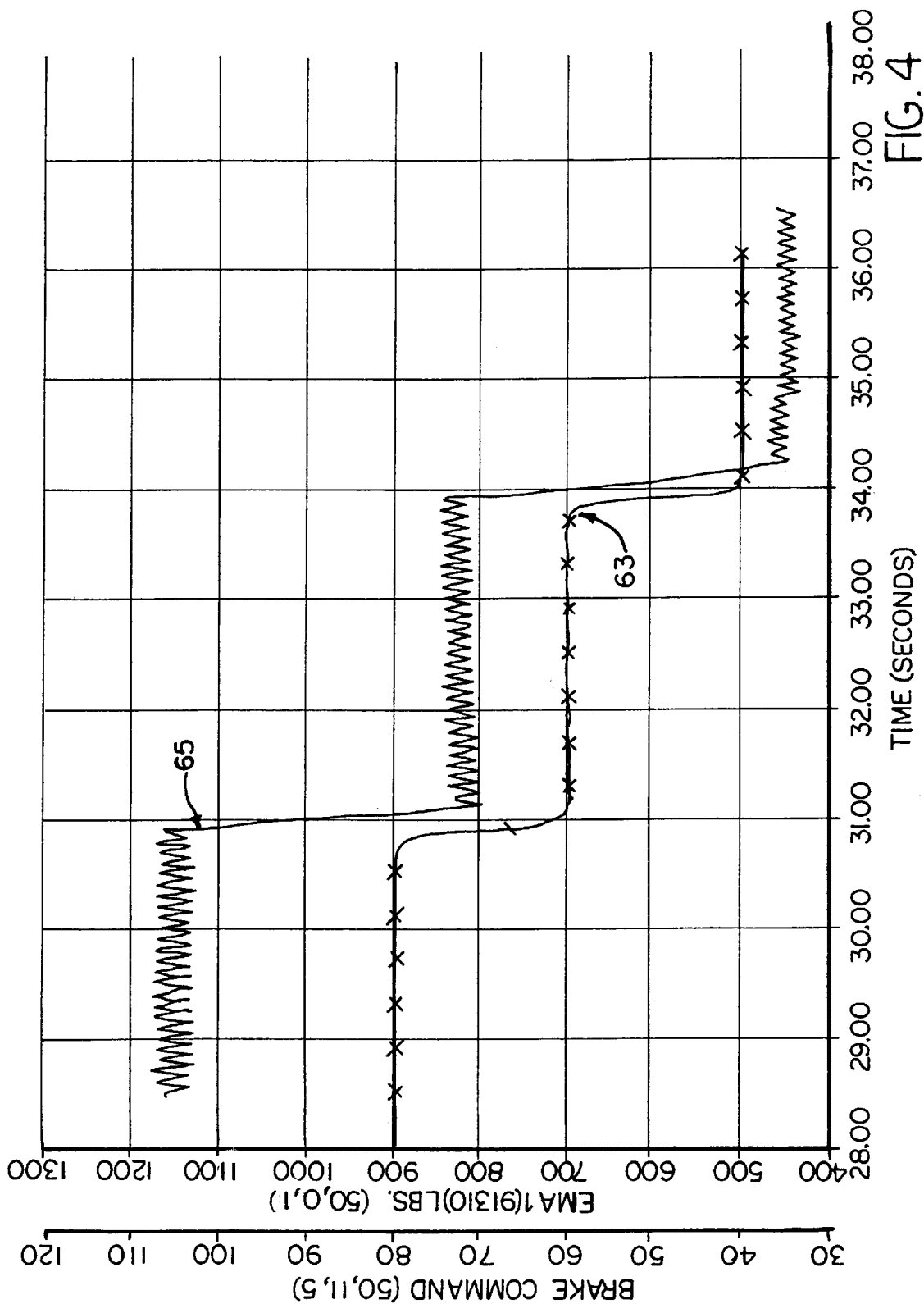
FIG. 4 is a graph comparing commanded force and resulting actuator output force.

In the test data of FIG. 4, braking force command is shown by curve 63 and the resulting brake actuator output force is shown by curve 65. The highest level of curve 65 corresponds to the application of an actuator force of about 1150 pounds and persists between 28.5 seconds and 31 seconds. The command waveform is relatively smooth and constant during this time interval, however, the resulting force jiggles up and down numerous times during the application of this braking force level. Each jiggle corresponds to a disable command pulse. Note the period of the disable command waveform is only a small fraction of the duration of brake application at this level.

Rather than dithering a command signal, the present invention cycles a disable signal. The voltage applied to the motor is either at the commanded level or zero. The duty cycle and pulse repetition rate, as illustrated in FIG. 3, can be configured as desired, however, this technique is not pulse-width modulation. The pulse width is configurable but does not change during operation. The control information is in the amplitude rather than the pulse width. Though it seems like this technique should reduce the maximum force below that available with full un-pulsed command, it actually increases the maximum force because stiction at the maximum command level is overcome. Since the present invention does not achieve the pulsing effect by changing the command level, the dynamic effects of dither on analog power logic are avoided. When the disable is asserted, all force is removed at once. This causes the brake to "push back" on the actuator in response. This keeps the gears engaged just as they were when force was applied, and so prevents losses due to gear backlash which might occur if the motor was commanded to back off.

The invention has been described in a preferred environment of an aircraft braking system, however, it may be employed in conjunction with a wide variety of electromechanical actuating devices. Some of these devices may be spring or otherwise biased to return to a quiescent or initial position when the driving signal is removed while others may require a reverse or return signal to the actuator. For actuators having an inherent, e.g., spring bias, return, it is important that the duration of the interrupt (off time in FIG. 3) be considerably less than the time required by the actuator to return to its initial position, otherwise the actuator will merely cycle between initial and final positions. Both types of actuators have a determinable response time in moving from an initial or rest position toward an enabled position for exerting a command determined force on an object and the duration of each interruption should be less than the response time of the actuator, that is, the analog signal is interrupted for a time interval less than the time required for the actuator to move in either direction between the extended to the retracted positions. This momentary hesitation in the application of the force provides enhanced repeatability. In the particular application of a braking system, the analog signal is interrupted for a time interval less than the time required to disable the motor and remove all braking force from the wheel.

What is claimed is:

1. An electromechanical system, comprising:
   an electromechanical actuator having a determinable response time and operable upon receipt of an energizing signal to move from a disabled position toward an enabled position for exerting a command determined force on an object;
   a digital signal source for supplying a command determined force indicative digital signal;
   a digital to analog converter for receiving the digital signal and supplying an analog signal having a force indicative magnitude; and
   a circuit for repeatedly interrupting the analog signal, the duration of each interruption being less than the response time of the actuator.

2. The system of claim 1, wherein the actuator comprises a multi-winding direct current brushless motor, the system further including a commutator circuit for supplying the repeatedly interrupted analog signal sequentially to each of the motor windings.

3. The system of claim 1, wherein the actuator comprises an electric motor, the system further including a speed reducing, torque increasing gear train, and a rotary to linear motion converter.

4. The system of claim 1, wherein the circuit for repeatedly interrupting the analog signal includes a disable command generator for creating a pulse train and an electronic switching circuit responsive to the pulse train to repetitively pass and block the analog signal.

5. A process of applying a compressive force to a compressible stack of interleaved braking disks to apply a braking force to a rotating wheel, comprising the steps of:
   providing an operator initiated digital braking command indicative of a desired braking force;

converting the digital command to an analog signal having a magnitude indicative of the desired braking force;

periodically interrupting the analog signal;

supplying the interrupted analog signal to a motor;

mechanically converting motor motion from rotation to a linear motion; and applying the linear motion to compress the braking disks.

6. The process of claim 5, wherein the step of mechanically converting is performed by a speed reducing, torque increasing gear train.

7. The process of claim 5, wherein the analog signal is interrupted for a time interval less than the time required to disable the motor and remove all braking force from the wheel.

8. The process of claim 5, including the additional step of commutating the interrupted analog signal subsequent to conversion and prior to supplying the signal to the motor.

9. A process of selectively applying a force to an object, comprising the steps of:

providing an analog signal having a magnitude indicative of the desired force;

periodically interrupting the analog signal;

supplying the interrupted analog signal to an electromechanical actuator to cause an actuator portion to move from a retracted position to an extended position where the portion engages and applies a force to the object.

10. The process of claim 9, wherein the analog signal is interrupted for a time interval less than the time required for the actuator portion to return from the extended to the retracted position.

11. The process of claim 9, wherein the step of periodically interrupting the analog signal includes creating a pulse train and electronically passing and blocking the analog signal in synchronism with the pulse train.

12. The process of claim 9, wherein the actuator comprises an electric motor, the process further including increasing the motor torque output by gearing down the motor speed, converting the motor rotary motion into a linear motion, and transmitting that linear motion to the actuator portion.

13. The process of claim 9, wherein the actuator comprises a multi-winding direct current brushless motor, the process further including supplying the periodically interrupted analog signal sequentially to each of the motor windings to generate a rotating magnetic field in the motor.

14. The process of claim 9, wherein the object is a pressure plate of a disk braking system for applying a braking force to a rotating wheel, the process including the further steps of providing an operator initiated digital braking command indicative of a desired braking force, and converting the digital command to an analog signal having a magnitude indicative of the desired braking force.

15. The process of claim 14, wherein the actuator comprises an electric motor, the process further including mechanically converting motor motion from rotation to a linear motion, and applying the linear motion to the pressure plate to compress braking disks and apply a braking force to a wheel.

16. The process of claim 15, wherein the analog signal is interrupted for a time interval less than the time required to disable the motor and remove all braking force from the wheel.

17. In an electromechanical system having an electric motor, a rotary to linear motion converter and a gear train mechanically coupling the motor to the converter for selectively applying a force to an object where the converter and gear train collectively have a small amount of free play, a process of enhancing repeatability of the force applied to the object comprising the steps of:

providing an analog signal having a magnitude indicative of the desired force;

supplying the analog signal to the motor to apply force to the object;

removing the analog signal from the motor; and resupplying the analog signal to the motor prior to any free play motion occurring within the gear train and converter.

18. The process of claim 17, including repeatedly supplying the analog signal to the motor to apply force to the object, removing the analog signal from the motor, and resupplying the analog signal to the motor sufficiently often to prevent any free play motion from occurring within the gear train and converter.

19. The process of claim 17, wherein the step of reapplying prevents any backlash associated with the gear train and converter.

20. The process of claim 17, wherein the electromechanical system selectively applies a compressive force to a compressible stack of interleaved braking disks to apply a braking force to a rotating wheel, the process further including the steps of providing an operator initiated digital braking command indicative of a desired braking force, converting the digital command to an analog signal having a magnitude indicative of the desired braking force, the steps of removing and resupplying providing more consistent wheel braking in response to specific braking force commands.

* * * * *